(12) United States Patent
Holman et al.

(10) Patent No.: US 6,708,866 B2
(45) Date of Patent: Mar. 23, 2004

(54) METHOD AND APPARATUS FOR MACHINE TOOLING, SUCH AS FRICTION STIR WELDER

(75) Inventors: Donald J. Holman, Kirkland, WA (US); James A. Whitehouse, Gig Harbor, WA (US)

(73) Assignee: Nova-Tech Engineering, Inc., Mountlake Terrace, WA (US)

(*) Notice: Subject to any disclaimer, the term of this patent is extended or adjusted under 35 U.S.C. 154(b) by 0 days.

(21) Appl. No.: 09/965,619

(22) Filed: Sep. 26, 2001

(65) Prior Publication Data

US 2003/0057261 A1 Mar. 27, 2003

(51) Int. Cl.$^7$ .......................... B23K 20/12; B23K 37/00
(52) U.S. Cl. .................. 228/112.1; 228/2.1; 408/13
(58) Field of Search ................ 228/112.1, 2.1; 408/8–13, 146, 187; 409/50, 131, 483–188

(56) References Cited

U.S. PATENT DOCUMENTS

| | | | |
|---|---|---|---|
| 3,703,027 A | 11/1972 | Geyler | 29/39 |
| 3,823,644 A | 7/1974 | Mello | 90/17 |
| 4,118,844 A | 10/1978 | Matsuzaki et al. | 29/27 C |
| 4,478,540 A | 10/1984 | Sachot | 409/211 |
| 4,657,453 A | 4/1987 | Goulot et al. | 409/216 |
| 4,709,455 A | 12/1987 | D'Andrea et al. | 29/40 |
| 4,709,465 A | 12/1987 | Lewis et al. | 29/568 |
| 4,840,095 A | 6/1989 | Nussbaumer et al. | 82/117 |
| 5,238,340 A | 8/1993 | Ochiai et al. | 409/201 |
| 5,351,376 A | 10/1994 | Kitamura | 29/27 C |
| 5,460,317 A | 10/1995 | Thomas et al. | 228/112.1 |
| 5,477,602 A | 12/1995 | Bosma | 29/428 |
| 5,697,544 A | 12/1997 | Wykes | 228/2.1 |
| 5,718,545 A | 2/1998 | Husted | 409/201 |
| 5,893,507 A | 4/1999 | Ding et al. | 228/2.1 |
| 5,996,329 A | 12/1999 | Cardenas | 59/48.5 R |
| 6,019,013 A | * 2/2000 | Luik | 74/490.01 |
| 6,135,682 A | 10/2000 | McCalmont | 409/131 |
| 6,173,880 B1 | * 1/2001 | Ding et al. | 228/2.1 |
| 6,199,745 B1 | 3/2001 | Campbell et al. | 228/112.1 |
| 6,244,496 B1 | * 6/2001 | Kato et al. | 228/112.1 |
| 6,299,050 B1 | * 10/2001 | Okamura et al. | 156/73.5 |
| 6,302,315 B1 | * 10/2001 | Thompson | 228/112.1 |
| 6,311,889 B1 | * 11/2001 | Ezumi et al. | 156/73.5 |
| 6,419,142 B1 | 7/2002 | Larsson | |
| 2001/0019073 A1 | * 9/2001 | Ezumi et al. | |
| 2002/0027153 A1 | * 3/2002 | Sayama et al. | |
| 2002/0027155 A1 | * 3/2002 | Okamura et al. | |
| 2002/0050508 A1 | * 5/2002 | Yoshinaga | |
| 2002/0145031 A1 | * 10/2002 | Hirano et al. | |
| 2002/1090103 | * 12/2002 | Yoshinaga | |
| 2002/1090104 | * 12/2002 | Yoshinaga | |
| 2002/1093217 | * 12/2002 | Yoshinaga | |

FOREIGN PATENT DOCUMENTS

| | | | |
|---|---|---|---|
| JP | 2000202646 A | * | 7/2000 |
| JP | 02001321966 A | * | 11/2001 |

* cited by examiner

*Primary Examiner*—Kiley Stoner
(74) *Attorney, Agent, or Firm*—Seed IP Law Group PLLC

(57) ABSTRACT

A friction stir welding tool includes a friction stir welding head having a probe and spindle rotatably mounted at a first end. A support supports the stir welding head between the first end and a second end for movement about a pitch axis. A pitch actuator includes an elongated arm coupled to the stir welding head at a point longitudinally spaced from pitch axis to overcome the relatively large forces exerted at the probe. A turntable supports the stir welding head for movement about a yaw axis. A yaw actuator includes an elongated arm coupled to the turntable laterally spaced from the yaw axis, to overcome the relatively large forces exerted at the probe. A controller maintains an angle of attack of the probe with respect to direction of travel of the probe along the work piece.

20 Claims, 8 Drawing Sheets

METHOD AND APPARATUS FOR MACHINE TOOLING, SUCH AS FRICTION STIR WELDER

BACKGROUND OF THE INVENTION

1. Technical Field

The present invention relates to machine tools and systems and methods for positioning machine tools, particularly friction stir welders.

2. Description of the Related Art

Friction stir welding is a method of joining work pieces using friction heat generated at adjacent portions of the work pieces to form a plasticized region which solidifies as a welding joint. The work pieces may consist of initially separate pieces, or an integral piece having a crack, gap, or other opening. Some aspects of stir welding and stir welding systems are taught in U.S. Pat. No. 5,460,317 issued Oct. 24, 1995, to Thomas et al.; U.S. Pat. No. 5,697,544 issued Dec. 16, 1997, to Wykes; U.S. Pat. No. 5,893,507 issued Apr. 13, 1999, to Ding et al.; and U.S. Pat. No. 6,199,745 B1 issued Mar. 13, 2001, to Campbell et al.

As shown in FIG. 1, a friction stir welding head 1 includes a probe such as a pin 2, which is inserted into the joint between the work pieces 3. Typically, the pin 2 spins to generate friction heat to form a plasticized region along the joint for welding. The friction stir welding head 1 also includes a shank, shoulder or spindle 4, that contacts an upper surface 5 of the work pieces 3 to retain the plasticized material within the joint. Typically, the spindle 4 spins to form a plasticized region at the upper surface 5 of the work pieces 3. In some embodiments, the pin 2 and the spindle 4 may spin independently of each other at different rotational velocities.

The work pieces 3 may be supported by a rigid table or back plate 6, such as a steel plate. The rigid back plate 6 provides support so that the work pieces 3 do not bend or deform under the load. To maximize the strength of the joint, the welded portion should extend through the entire thickness of the work pieces 3. To assure that the weld extends the entire thickness, sufficient friction heat must be generated between the upper and lower surfaces of the work pieces. The pin 2 may be retractable to prevent leaving a keyhole at the weld termination, and to accommodate work pieces of different thickness.

The work pieces 3 are restrained to prevent movement away from one another as the pin 2 passes through the work pieces 3. The welding process creates high normal and side forces at the pin 2 to achieve the desired magnitude of friction. Consequently, the pin 2, spindle 4 and/or head 1 must overcome large forces exerted through the work pieces 3. This is particularly true when the pin 2 changes its direction of travel with respect to the work pieces 3. The relative motion of the pin 2 and work pieces 3 are identified by opposed arrows 7, 8.

Also as shown in FIG. 1, the pin 2 may be slightly angled in the direction of travel 7,8 with respect to the work pieces 3. The angle 10 is typically denominated as the angle of attack 10. Maintaining the angle of attack 10 is particularly difficult where the pin 2 changes its direction of travel 7,8 with respect to the work pieces 3.

SUMMARY OF THE INVENTION

In one aspect, friction stir welding system includes a turntable support; a turntable mounted to the turntable support for pivotal movement about a yaw axis; a yaw actuator having an elongated arm, the elongated arm coupled to the turntable at a point spaced from the yaw axis; a head support mounted to the turntable for movement therewith; a friction stir welding head having a first end and a second end opposed to the first end, a probe mounted proximate the first end for rotation about a longitudinal axis, and a spindle mounted proximate the first end for rotation about the longitudinal axis, the friction stir welding head supported by the head support for pivotal movement about a pitch axis, the pitch axis spaced between the first end and the second end of the friction stir welding head and extending laterally with respect to the longitudinal axis and perpendicularly with respect to the yaw axis; and a pitch actuator having an elongated arm, the elongated arm coupled to the friction stir welding head at a point on the friction stir welding head longitudinally spaced from pitch axis. The friction stir welding system may further include a plunge actuator having an arm, a gear box and a servo motor, the arm coupled to the turntable support to provide linear movement of the turntable support along a roll axis, the roll axis being perpendicular to both the pitch axis and the yaw axis; means for driving the probe; means for driving the spindle; a carriage carrying the turntable support, the turntable, the yaw actuator, the head support, the friction stir welding head, the pitch actuator, the means for driving the probe, means for driving the spindle; a frame supporting the carriage for linear movement with respect thereto; and a base supporting the frame for linear movement with respect thereto in a direction generally perpendicular to the direction of movement of the carriage with respect to the frame.

In another aspect, a friction stir welding tool includes a head support; a friction stir welding head having a first end and a second end opposed to the first end, a probe mounted proximate the first end for rotation about a longitudinal axis, and a spindle mounted proximate the first end for rotation about the longitudinal axis, the friction stir welding head supported by the head support for pivotal movement about a pitch axis, the pitch axis spaced between the first end and the second end of the friction stir welding head and extending laterally with respect to the longitudinal axis; and a pitch actuator having an elongated arm, the elongated arm coupled to the friction stir welding head at a point on the friction stir welding head longitudinally spaced from pitch axis.

In a further aspect, a machine tool for operating on a work piece includes a work bit having a longitudinal axis; a motor for rotationally driving the work bit about the longitudinal axis; a pitch actuator coupled to control movement of the work bit about a pitch axis; a yaw actuator coupled to control movement of the work bit about a yaw axis, the yaw axis perpendicular to the pitch axis; and a controller controllingly coupled to the pitch and yaw actuators and programmed to maintain an angle between the longitudinal axis of the work bit and a direction of travel of the work bit relative to the work piece, as the direction of travel of the work bit relative to the work piece changes between a first direction and a second direction.

In yet a further aspect, a method of operating a stir welder includes advancing a probe in a first direction relative to a work piece; advancing the probe in a second direction relative to the work piece, the second direction different than the first direction; and maintaining an angle between a longitudinal axis of the probe and a direction of travel of the probe relative to the work piece, as the direction of travel of the probe changes between the first and the second directions.

BRIEF DESCRIPTION OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been selected solely for ease of recognition in the drawings.

DETAILED DESCRIPTION OF THE PREFERRED EMBODIMENT

In the following description, certain specific details are set forth in order to provide a thorough understanding of various embodiments of the invention. However, one skilled in the art will understand that the invention may be practiced without these details. In other instances, well-known structures associated with stir welders, machine tools, controllers, computing systems, and actuators have not been described in detail to avoid unnecessarily obscuring the descriptions of the embodiments of the invention.

Unless the context requires otherwise, throughout the specification and claims which follow, the word "comprise" and variations thereof, such as "comprises" and "comprising" are to be construed in an open, inclusive sense, that is as "including but not limited to."

Figure 2:
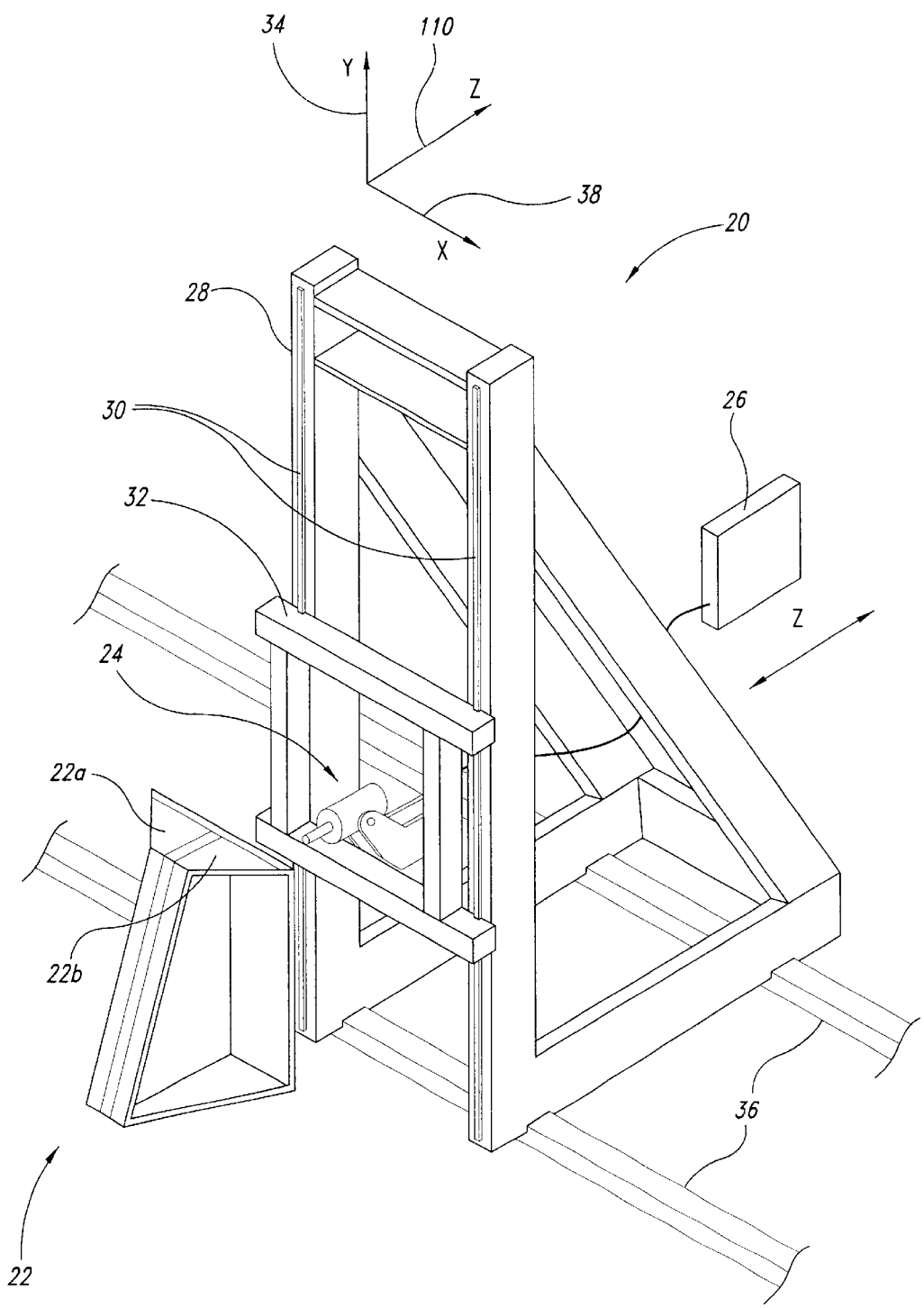
FIG. 2 is a front right top isometric view of a stir welding system.

FIG. 2 shows a machine tool system in the form of a stir welding system 20 for joining first and second work pieces 22A, 22B. As discussed above, the first and second work pieces 22A, 22B may initially be separate work pieces, or may integral portions of a single work piece, such as a work piece having a slit, cut, window or other opening requiring joining.

The friction stir welding system 20 includes a friction stir welding tool 24, controlled by a controller or processor such as a programmed computing system 26. The computing system 26 can take any of a variety of forms, such as a personal computer ("PC"), minicomputer, mainframe computer or collection of networked computers. The computing system 26 can operate in a networked environment. The computing system 26 executes software for controlling the various components of the friction stir welding system 20, for example, by controlling various actuators generally described below. The software can be stored in volatile memory such as random access memory ("RAM"), and/or in non-volatile memory such as read only memory ("ROM"), CD-ROM, floppy disks, or optical disks, as is generally known by those skilled in the computing arts.

The friction stir welding tool 24 is supported by a frame, such as the A-frame structure 28. The A-frame structure 28 may include one or more linear guides 30 for guiding a carriage 32 that carries the friction stir welding tool 24. The carriage 32 may slide or roll along the linear guides 30, allowing the friction stir welding tool 24 to be moved along a first axis 34 with respect to the work pieces 22A, 22B. The A-frame structure 28 may itself be carried by a pair of rails 36. The A-frame structure 28 may slide or roll along the rails 36, allowing the friction stir welding tool 24 to be moved along a second axis 38 with respect to the work piece. The second axis 38 may be perpendicular with respect to the first axis 34 to allow planar positioning of the friction stir welding tool 24 with respect to the work pieces 22A, 22B. While not shown, the friction stir welding system 20 can include an assembly for rotating the work pieces 22A, 22B with respect to the friction stir welding tool 24. This may be particular useful for welding seams in cylindrical objects, such as tanks.

The friction stir welding system 20 can include actuators such as motors (not shown) to mechanically move the A-frame structure 28 along the rails 36, to move the carriage 32 along the linear guides 30 and/or to rotate the work pieces 22A, 22B. The computing system 26 can provide operational signals to the motor(s) to control the positioning of the A-frame structure, 28 carriage 32 and/or rotation assembly with respect to the work pieces 22A, 22B.

Figure 3:
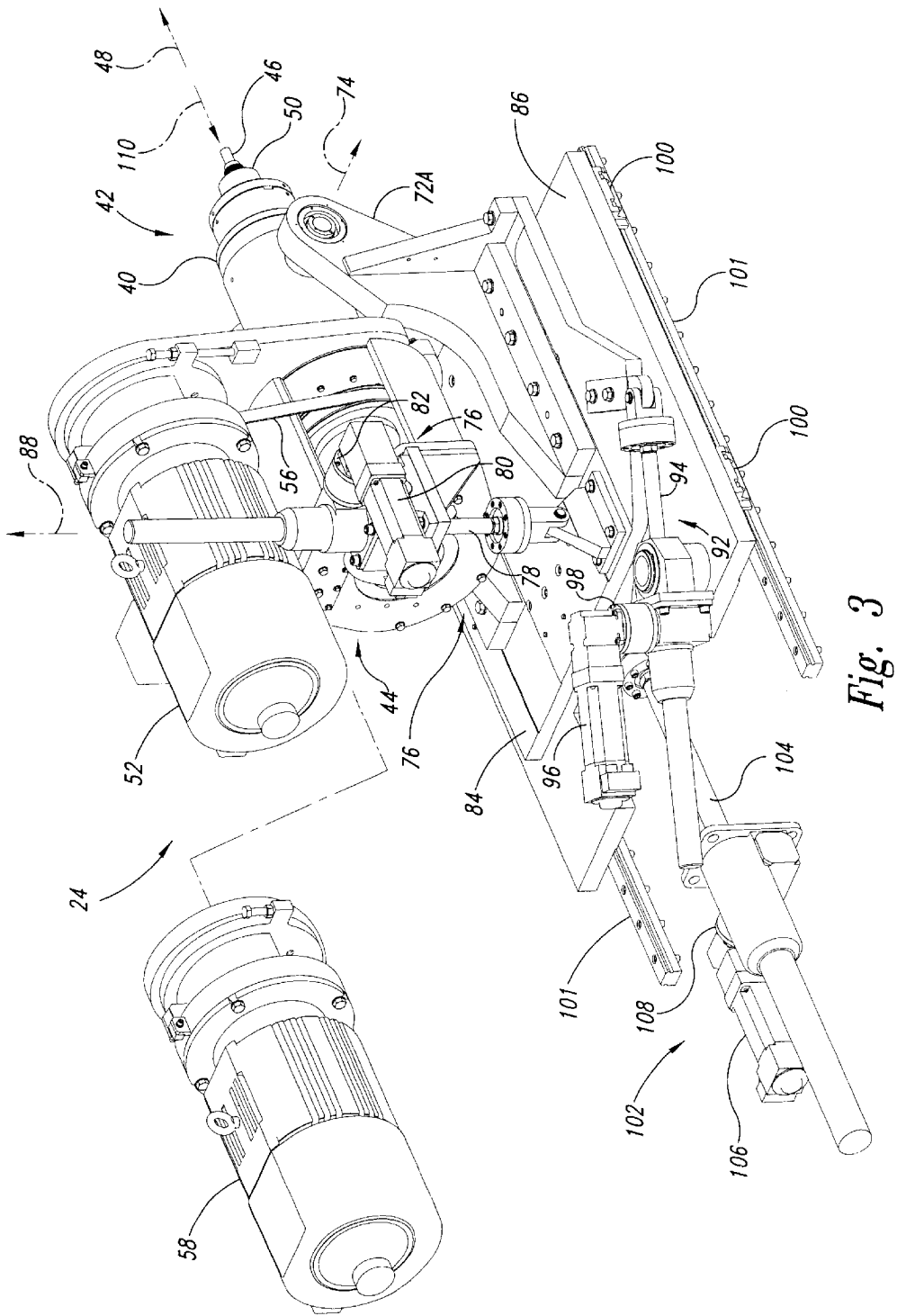
FIG. 3 is a rear left top, partially-exploded view of a stir welding tool including a stir welding head, head support, turntable, and table.
Figure 4:
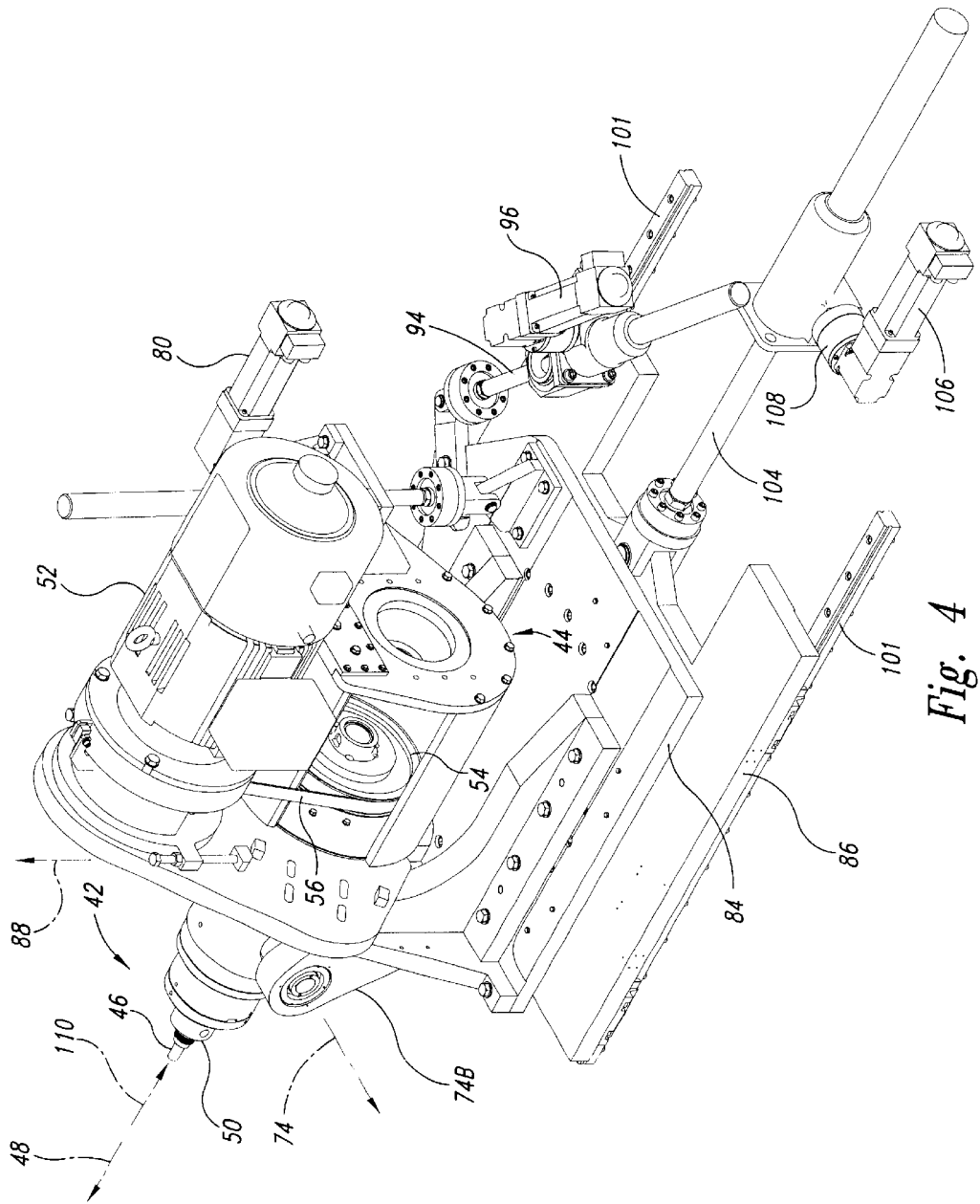
FIG. 4 is a top right rear partial isometric view of the stir welding tool of FIG. 3.
Figure 5:
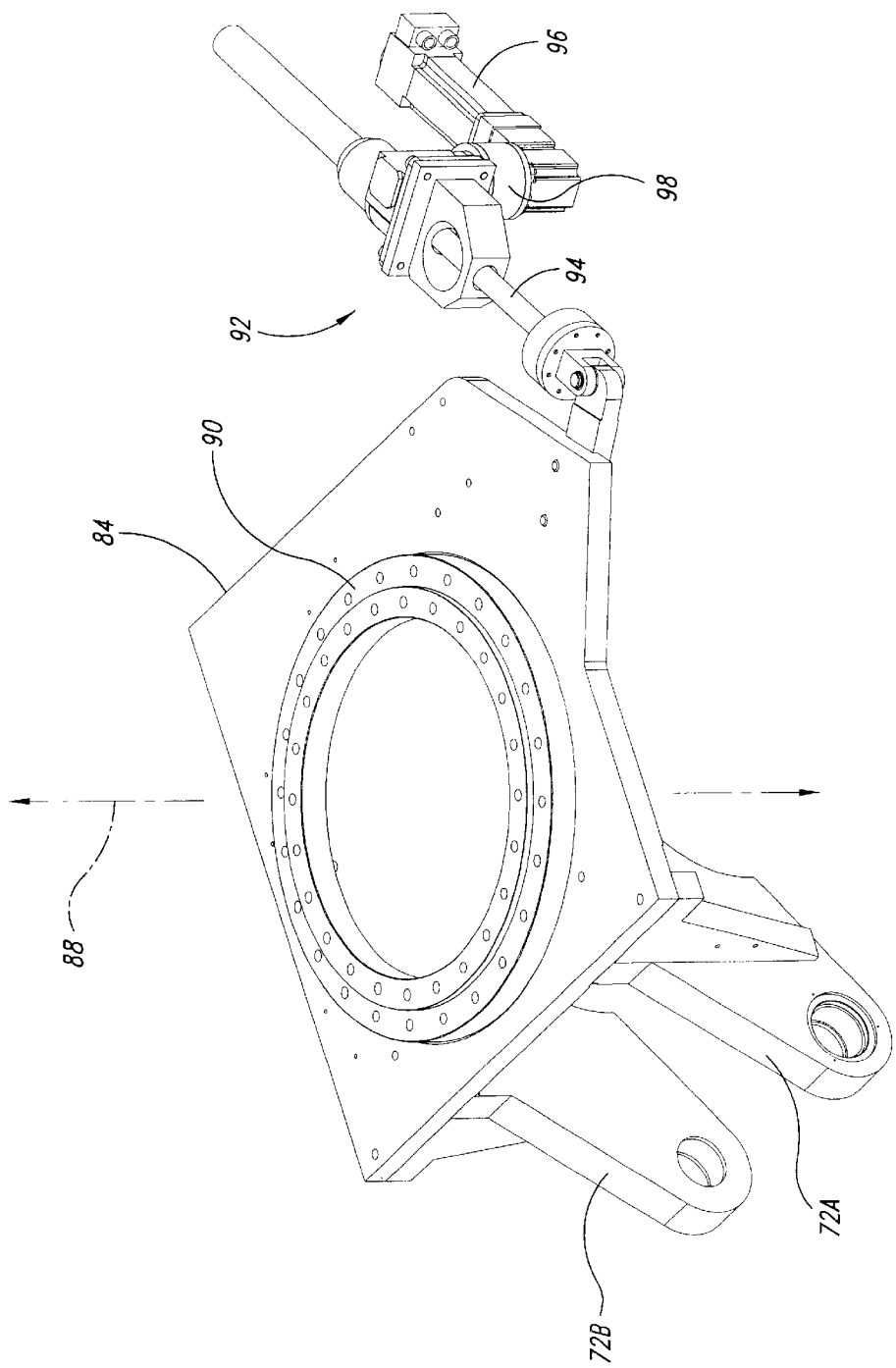
FIG. 5 is a bottom left front isometric view of the turntable of FIGS. 3 and 4.

FIGS. 3, 4 and 5 show a portion of the friction stir welding tool 24. The friction stir welding tool 24 includes a friction stir welding head 40 having a first end 42 and a second end 44 opposed to the first end 42. A probe, such as a pin 46, is mounted at the first end 42 of the friction stir welding head 40 for rotation about a longitudinal axis 48. A spindle 50 also located at the first end 42 of the friction stir welding head 40 is also mounted for rotation about the longitudinal axis 48. The pin 48 and spindle 50 are capable of independent rotation, thus each can rotate at a different rotation velocity. A motor, such as a stepper motor 52, is coupled to a drive pulley 54 by a drive belt 56 for driving the spindle 50. A similar motor 58, drive pulley, and belt combination drive the pin 46. (The drive pulley and drive belt are omitted for clarity of illustration).

A pair of opposed head supports 72A, 72B support the friction stir welding head 40 between the first and second ends 42, 44, for pivotal movement about a pitch axis 74. A pitch actuator 76 includes a jack screw 78 coupled to the friction stir welding head 40 at a point spaced form the pitch axis 74, such as at a point proximate the second end 44. The pitch actuator 76 also includes a stepper motor 80 and gearbox 82 for turning the jack screw 78. Turning of the jack screw 78 can exert a force on the friction stir welding head 40 at the point spaced from the pitch axis 74. By spacing the jack screw 78 away from the pitch axis 74, the friction stir welding tool 24 can overcome the relatively large forces exerted at the pin 46 and spindle 50. The computing system 26 (FIG. 2), or some other controller, can control the stepper motors 52, 58.

A turntable 84 carries the head supports 72A, 72B. The turntable 84 is mounted to a table 86 for rotation about a yaw axis 88, best illustrated in FIG. 5. The turntable 84 can rotate on a bearing 90, also illustrated in FIG. 5. A yaw actuator 92 includes a jack screw 94 coupled to the turntable 84 at a point spaced away from the yaw axis 88. The yaw actuator 92 also includes a stepper motor 96 and gear box 98 for turning the jack screw 94. Turning the jack screw 94 can exert a force on the turntable at a point laterally spaced from the yaw axis 88. By spacing the jack screw 94 away from the yaw axis 88, the friction stir welding tool 24 can overcome the relatively large forces exerted at the pin 46 and spindle 50. The computing system 26 (FIG. 2), or some other controller, can control the stepper motor 96.

The table 86 may include one or more followers 100 for following linear table guides 101 on the carriage 32 (FIG. 2). The followers 100 allow the table 86 to slide or roll along the linear table guides 101, allowing the table 86 to move along a roll axis 110. A plunge actuator 102 includes a jack screw 104 coupled to the table 86. The plunge actuator 102 also includes a stepper motor 106 and gearbox 108. Turning the jack screw 104 can exert force on the table 86. Thus, the jack screw 104 can move the table 86 along with the turntable 84 and friction stir welding head 40 along a roll axis 110. The computing system 26 (FIG. 2), or some other controller, can control the stepper motor 106.

The pitch axis 74, yaw axis 88 and roll axis 110 can form an orthogonal coordinate system. As illustrated in FIGS. 3 and 4, the longitudinal axis 48 of the pin 46 may be co-linear with the roll axis 110 where there is no pitch about the pitch axis 74 or yaw about the yaw axis 88. Thus, the friction stir welding system 20 may provide up to five degrees of freedom, and yet may still overcome the significant forces encountered at the pin 46 and/or spindle 50.

Figure 6:
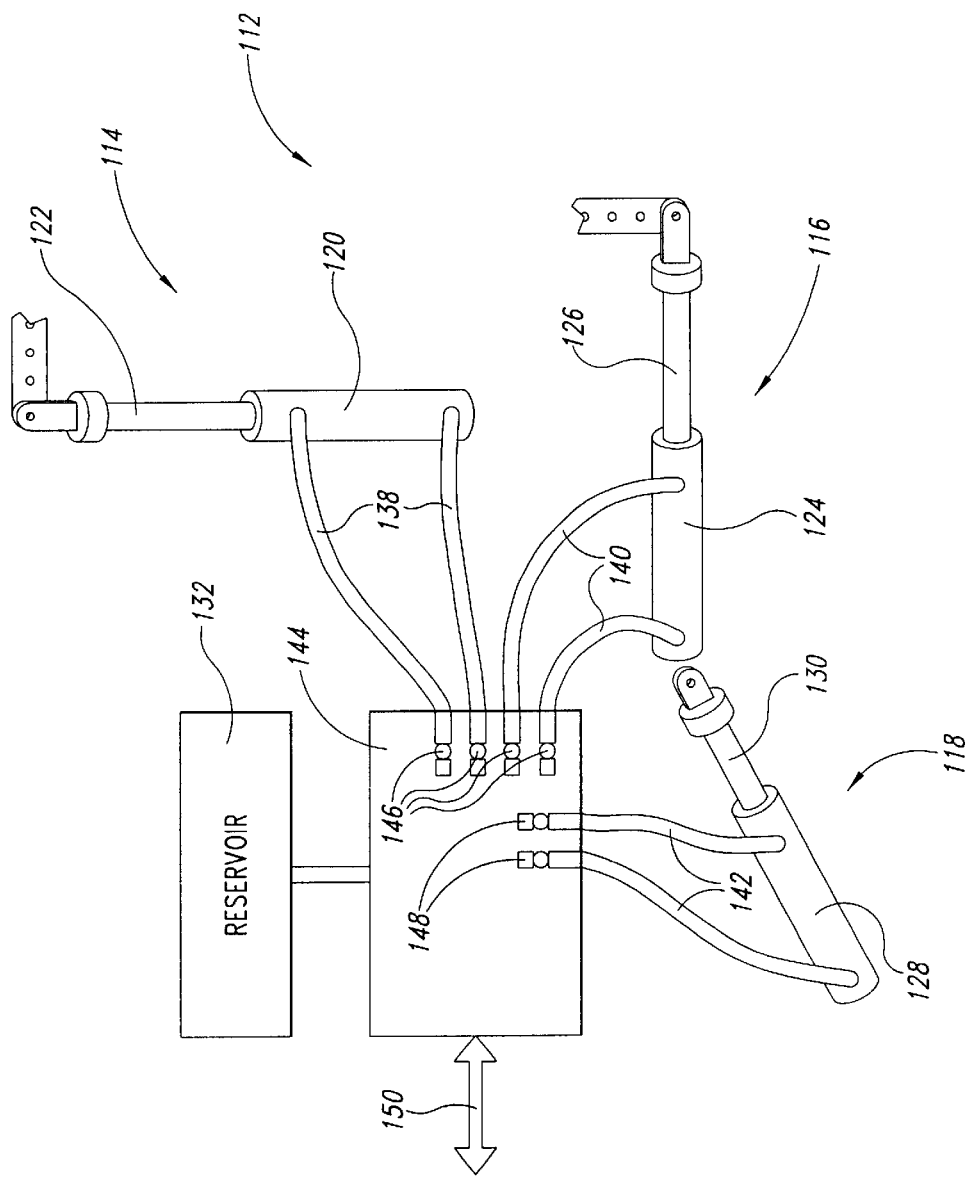
FIG. 6 is a rear left top, view of a portion of an alternative embodiment of a stir welding tool, including hydraulic actuators.

FIG. 6 shows an alternative actuator structure 112 employing hydraulics for the pitch, yaw and plunge actuators 114, 116, 118, respectively. The pitch actuator 114 includes a cylinder 120, a piston (not illustrated) slidingly received in the cylinder 120 and an elongated arm 122 attached to the piston and extending from the cylinder 120 to couple to the friction stir welding head 40 (FIGS. 3, 4 and 5). The yaw actuator 116 includes a cylinder 124, a piston (not illustrated) slidingly received in the cylinder 124 and an elongated arm 126 attached to the piston and extending from the cylinder 124 to couple to the turntable 84. The plunge actuator 118 includes a cylinder 128, a piston (not illustrated) slidingly received in the cylinder 128 and an elongated arm 130 attached to the piston and extending from the cylinder 128 to couple to the table 86. Each cylinder 120, 124, 128 is coupled to a reservoir 132 of hydraulic fluid by a pair of hoses 138, 140, 142 via a control mechanism 144. The control mechanism 144 includes a set of valves 146 and solenoids 148 for opening and closing the values 146 in response to control signals received via an interface 150 for controlling the movement of the elongated arms 122, 126 and 130.

Figure 1:
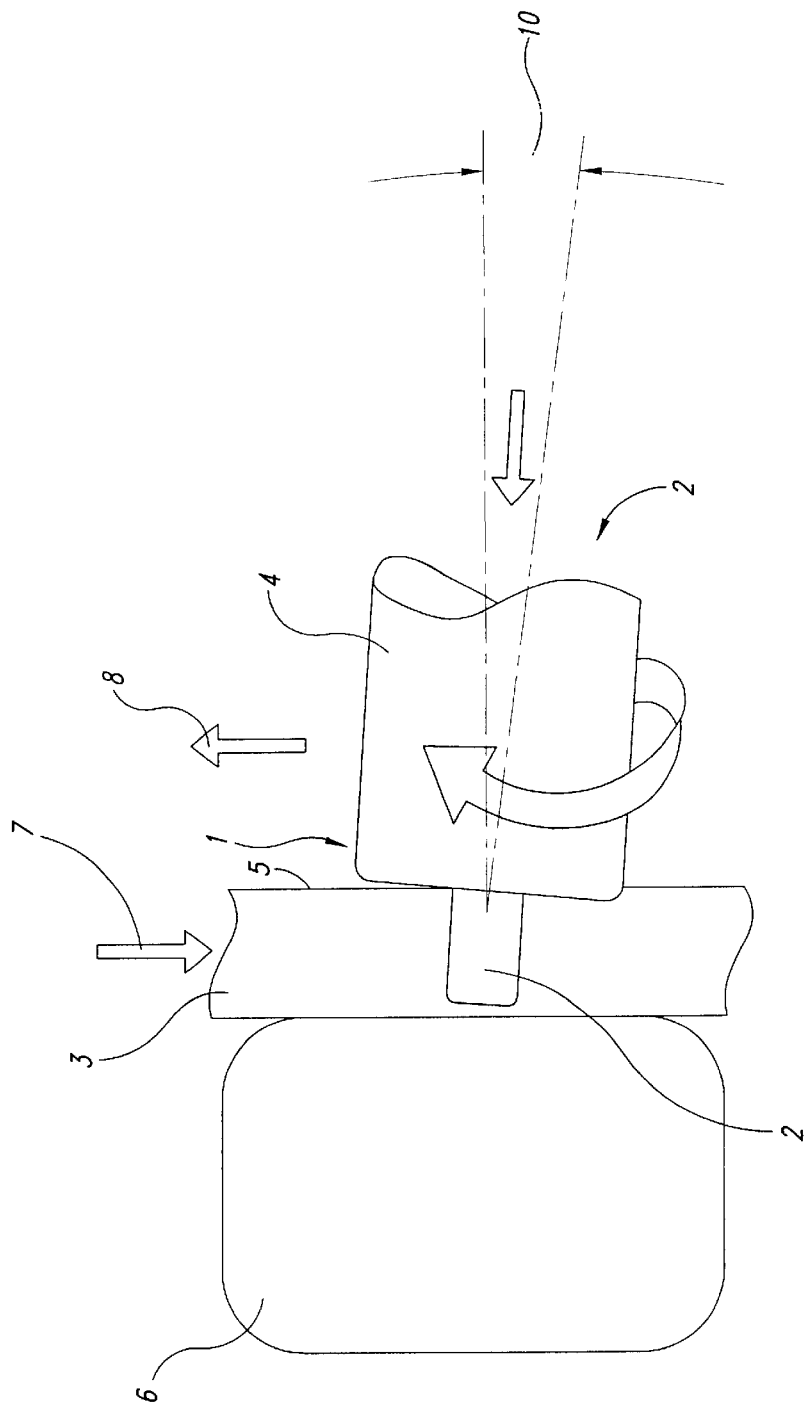
FIG. 1 is a cross-sectional view showing a probe in the form of a rotatable pin and a rotatable shoulder or spindle.

The computing system 26 can execute software to transition the angle of attack 10 (FIG. 1) of the pin 46 as the direction of travel of the pin 48 changes with respect to the work pieces 22A, 22B. The software can calculate the desired rotation about the pitch axis 74 and about the yaw axis 88 based on a current or prospective direction of travel. For example, the angle of rotation about the pitch axis 74 may be a maximum value, such as approximately 3° and the angle of rotation about the yaw axis 88 may be a minimum value, such as approximately 0° while the pin 48 moves along the Y-axis (FIG. 2). Also for example the angle of rotation about the pitch axis 74 may be a minimum value, such as approximately 0°, and the angle of rotation about the yaw axis 88 may be a maximum value, such as approximately 3°, while the pin 48 travels along the X-axis (FIG. 2).

The rotation about the pitch and yaw axis 74, 88 can be varied between these minimum and maximum values in proportion to the vector components of the direction of travel in the XY plane (FIG. 2). (As discussed above, the friction stir welding system 20 operates based on the relative direction of travel, and it does not matter whether the pin 48, the work piece 22A, 22B, or both are moving with reference to the real world coordinates.) Thus, the angle of attack 10 may be maintained at an approximately constant value in the direction of travel, even as the pin 48 follows an arc or an irregular path with respect to the work pieces 22A, 22B.

Figure 7:
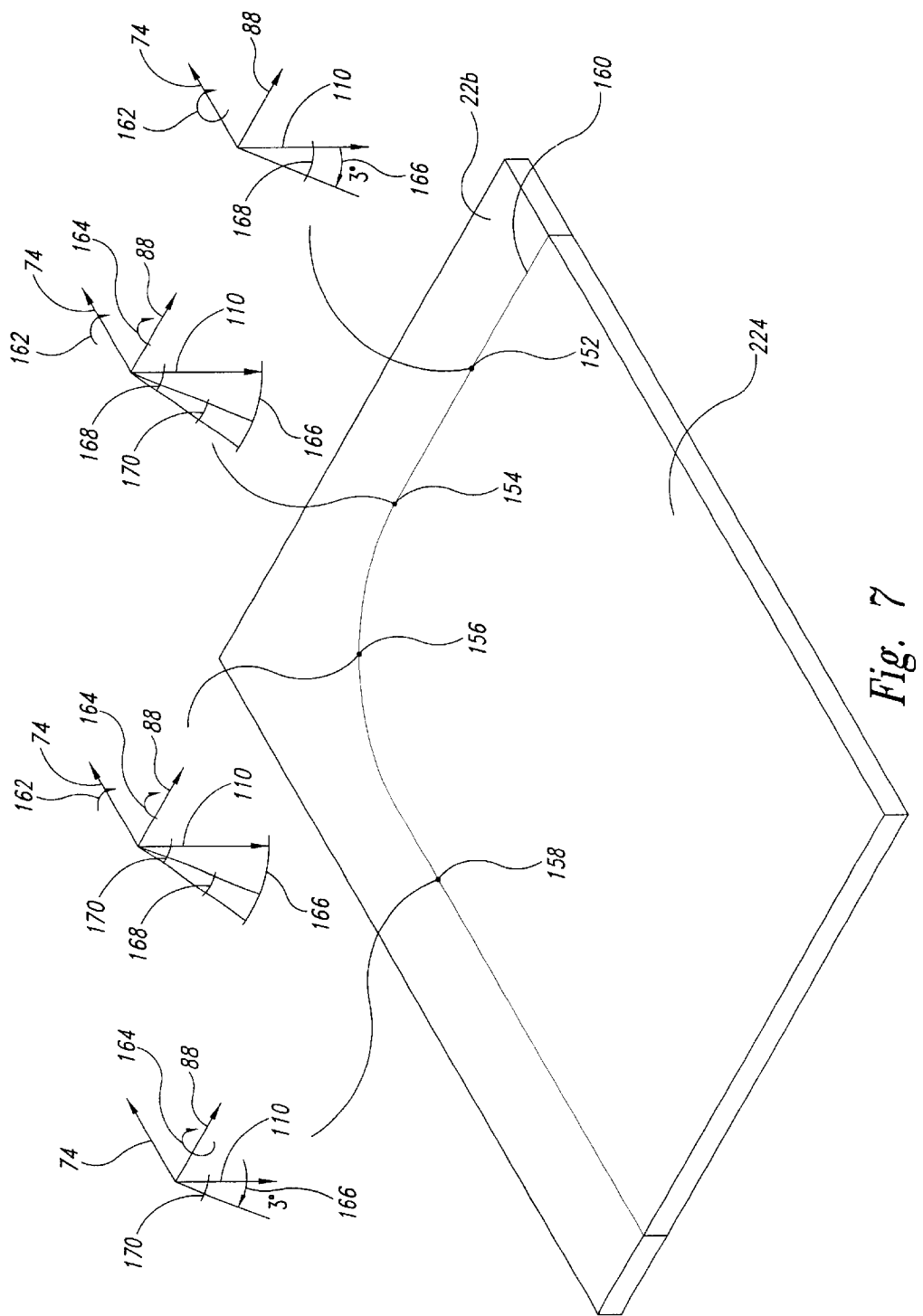
FIG. 7 is an isometric view of a path of a pin along a work piece, with the orientation of the pin illustrated for four points along the path.

FIG. 7 illustrates the rotation about the pitch and yaw axes 74, 88 to maintain a constant angle of attack with respect to the direction of travel. The pitch, yaw and roll axes 74, 88, 110, respectively, are shown at four representative points 152, 154, 156, 158 along a path 160 that the pin 48 (FIG. 1) travels with respect to the work pieces 22A, 22B. The relative rotation about the pitch and yaw axes 74, 88 are represented by arrows 162, 164, respectively, although the lengths of the arrows have been exaggerated in the illustration to better illustrate the differences. The relative amount that the rotation about the pitch axis 74 contributes to the total angle of attack 166 is illustrated by the pitch angle 168, while the relative amount that the rotation about the yaw axis 88 contributes to the total angle of attack 166 is illustrated by the yaw angle 170. The arc of the angles have been exaggerated in the illustration to better illustrate the differences.

Figure 8:
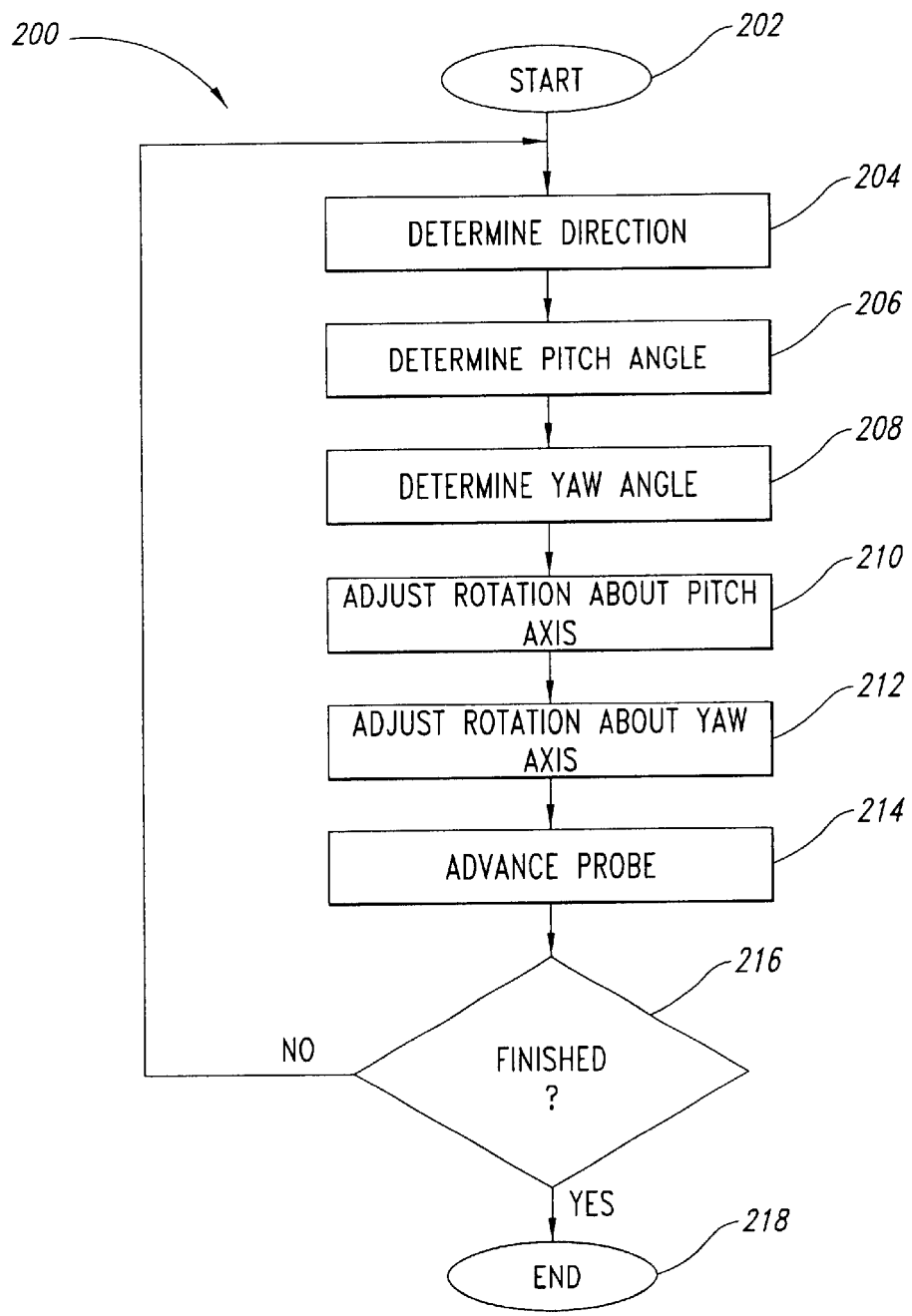
FIG. 8 is a flow diagram of an illustrated method of operating the illustrated stir welding system.

FIG. 8 shows an exemplary method 200 of operating the stir welding system 20, starting in step 202. In step 204, the computing system 26 determines the direction of the pin 48 with respect to the work pieces 22A, 22B. In step 206, the computing system 26 determines the desired pitch angle 168 based on determined direction. In step 208, the computing system 26 determines the desired yaw angle 170 based on determined direction. In step 210, the computing system 26 adjusts the rotation about the pitch axis 74, for example by operating the jack screw 78 of the pitch actuator 76. In step 212, the computing system 26 adjusts the rotation about the yaw axis 88, for example by operating the jack screw 94 of the yaw actuator 92. In step 214, the computing system 26 advances the pin 48, for example by operating one or more motors to move the A-frame structure 28 along the rails 36 and/or the carriage 32 along the linear guides 30. In step 216, the computing system 26 determines whether the welding is finished. If the welding is not finished, the computing system 26 returns control to step 204. If the welding is finished, the computing system 26 terminates the method 200 in step 218.

Although specific embodiments of and examples for the machine tool system and method are described herein for illustrative purposes, various equipment modifications can be made without departing from the spirit and scope of the invention, as will be recognized by those skilled in the relevant art. The teachings provided herein of the invention can be applied to other machine tools, not necessarily friction stir welding. In general, it is not important whether the work pieces move and the stir welding head is fixed in the X-Y plane, or whether the stir welding head moves and the work pieces are fixed in the X-Y plane, or whether the work pieces and the stir welding head each move, so long as there is relative movement between the work pieces and the stir welding head. In some embodiments, the wiring may be less complicated if the friction stir welding system moves the work pieces in the real world coordinates while restricting the stir welding head to making minor movements about the pitch and yaw axis to adjust the angle of attack.

From the foregoing it will be appreciated that, although specific embodiments of the invention have been described herein for purposes of illustration, various modifications may be made without deviating from the spirit and scope of the invention. The various embodiments described above can be combined to provide further embodiments. All of the above U.S. patents, patent applications and publications referred to in this specification are each incorporated herein by reference in their entirety. Aspects of the invention can be modified, if necessary, to employ systems, circuits and concepts of the various patents, applications and publications to provide yet further embodiments of the invention.

These and other changes can be made to the invention in light of the above detailed description. In general, in the following claims, the terms used should not be construed to limit the invention so that specific embodiments disclosed in the specification and claims, but should be construed to include all machine tool positioning devices and methods that operate in accordance with the claims. Accordingly, the invention is not limited by the disclosure, but instead its scope is to be determined entirely by the following claims.

What is claimed is:

1. A friction stir welding system, comprising:

a turntable support;

a turntable mounted to the turntable support for pivotal movement about a yaw axis;

a yaw actuator having an elongated arm, the elongated arm coupled to the turntable at a point spaced from the yaw axis;

a head support mounted to the turntable for movement therewith;

a friction stir welding head having a first end and a second end opposed to the first end, a probe mounted proximate the first end for rotation about a longitudinal axis, and a spindle mounted proximate the first end for rotation about the longitudinal axis, the friction stir welding head supported by the head support for pivotal movement about a pitch axis, the pitch axis spaced between the first end and the second end of the friction stir welding head and extending laterally with respect to the longitudinal axis and perpendicularly with respect to the yaw axis; and a pitch actuator having an elongated arm, the elongated arm coupled to the friction stir welding head at a point on the friction stir welding head longitudinally spaced from pitch axis.

2. The friction stir welding system of claim 1 wherein the arm of the pitch actuator is coupled to the friction stir welding head proximate the second end of the friction stir welding head.

3. The friction stir welding system of claim 1 wherein the arm of the pitch actuator takes the form of a jack screw and the pitch actuator further comprises:

a gear box; and a servo motor coupled to drive the jack screw by way of the gear box.

4. The friction stir welding system of claim 1 wherein the arm of the pitch actuator takes the form of a piston, and the pitch actuator further comprises:

a hydraulic cylinder slidingly receiving the piston;

a hydraulic fluid reservoir coupled to provide a hydraulic fluid to the hydraulic cylinder; and a control valve coupled to control the hydraulic fluid to drive the piston by way of a pressure in the hydraulic cylinder.

5. The friction stir welding system of claim 1, further comprising:

a plunge actuator having an arm, a gear box and a servo motor, the arm coupled to the turntable support to provide linear movement to the turntable support along a roll axis, the roll axis being perpendicular to both the pitch axis and the yaw axis.

6. The friction stir welding system of claim 1 wherein the probe is retractable.

7. The friction stir welding system of claim 1, further comprising:

a plunge actuator having an arm, a gear box and a servo motor, the arm coupled to the turntable support to provide linear movement to the turntable support along a roll axis, the roll axis being perpendicular to both the pitch axis and the yaw axis;

means for driving the probe;

means for driving the spindle;

a frame; and a carriage carrying the turntable support, the turntable, the yaw actuator, the head support, the friction stir welding head, the pitch actuator, the means for driving the probe, means for driving the spindle, the carriage mounted to the frame for linear movement with respect thereto.

8. The friction stir welding system of claim 1, further comprising:

a plunge actuator having an arm, a gear box and a servo motor, the arm coupled to the turntable support to provide linear movement to the turntable support along a roll axis, the roll axis being perpendicular to both the pitch axis and the yaw axis;

means for driving the probe;

means for driving the spindle;

a carriage carrying the turntable support, the turntable, the yaw actuator, the head support, the friction stir welding head, the pitch actuator, the means for driving the probe, means for driving the spindle;

a frame supporting the carriage for linear movement with respect thereto; and a base supporting the frame for linear movement with respect thereto in a direction generally perpendicular to the direction of movement of the carriage with respect to the frame.

9. The friction stir welding system of claim 1 wherein the probe takes the form of at least one of a pin and a bobbin.

10. A friction stir welding tool, comprising:

a head support;

a friction stir welding head having a first end and a second end opposed to the first end, a probe mounted proximate the first end for rotation about a longitudinal axis, and a spindle mounted proximate the first end for rotation about the longitudinal axis, the friction stir welding head supported by the head support for pivotal movement about a pitch axis, the pitch axis spaced between the first end and the second end of the friction stir welding head and extending laterally with respect to the longitudinal axis; and a pitch actuator having an elongated arm, the elongated arm coupled to the friction stir welding head at a point on the friction stir welding head longitudinally spaced from pitch axis.

11. The friction stir welding tool of claim 10, further comprising:
a turntable support;
a turntable mounted to the turntable support for pivotal movement about a yaw axis which is perpendicular to the pitch axis, the head support mounted to the turntable for movement therewith; and
a yaw actuator having an elongated arm, the elongated arm coupled to the turntable at a point spaced from the yaw axis.

12. The friction stir welding tool of claim 10 wherein the arm of the pitch actuator takes the form of a jack screw and the pitch actuator further comprises:
a gear box; and
a servo motor coupled to drive the jack screw by way of the gear box.

13. The friction stir welding tool of claim 10, further comprising:
a plunge actuator having an arm, a gear box and a servo motor, the arm coupled to the turntable support to provide linear movement to the turntable support along a roll axis, the roll axis being perpendicular to both the pitch axis and the yaw axis.

14. The friction stir welding tool of claim 10, further comprising:
a turntable support;
a turntable mounted to the turntable support for pivotal movement about a yaw axis, the head support mounted to the turntable for movement therewith;
a yaw actuator having an elongated arm, the elongated arm coupled to the turntable at a point spaced from the yaw axis; and
a controller controllingly coupled to the pitch and the yaw actuators and programmed to maintain an angle between the longitudinal axis of the probe and a direction of travel of the probe relative to a work piece, as the direction of travel of the probe relative to the work piece changes between a first direction and a second direction.

15. A machine tool having for operating on a work piece; comprising:
a work bit having a longitudinal axis;
a motor for rotationally driving the work bit about the longitudinal axis;
a pitch actuator coupled to control movement of the work bit about a pitch axis;
a yaw actuator coupled to control movement of the work bit about a yaw axis, the yaw axis perpendicular to the pitch axis; and
a controller controllingly coupled to the pitch and yaw actuators and programmed to maintain an angle between the longitudinal axis of the work bit and a direction of travel of the work bit relative to the work piece, as the direction of travel of the work bit relative to the work piece changes between a first direction and a second direction.

16. The machine tool of claim 15 wherein the work bit comprises a probe and a spindle and the machine tool comprises a friction stir welder.

17. The machine tool of claim 15, further comprising:
means for moving the work piece to produce at least a portion of the travel of the work bit relative to the work piece.

18. The machine tool of claim 15, further comprising:
computer-readable media storing instructions for execution by the controller.

19. A method of operating a stir welder, comprising:
advancing a probe in a first direction relative to a work piece;
advancing the probe in a second direction relative to the work piece, the second direction different than the first direction; and
maintaining an angle between a longitudinal axis of the probe and a direction of travel of the probe relative to the work piece, as the direction of travel of the probe changes between the first and the second directions wherein the angle is not equal to zero and maintaining the angle between the longitudinal axis of the probe and the direction of travel of the probe relative to the work piece, as the direction of travel of the probe changes between the first and the second directions, comprises:
exerting a first force on a friction stir welding head carrying the probe through an elongated actuator arm at point spaced from a pitch axis about which the friction stir welding head is pivotally mounted;
exerting a second force on turntable supporting the friction stir welding head through a second elongated actuator arm at a point spaced from a yaw axis about which the turntable is pivotally mounted; and
proportionally adjusting the first and the second forces while the direction of travel of the probe changes.

20. A method of operating a stir welder, comprising:
advancing a probe in a first direction relative to a work piece;
advancing the probe in a second direction relative to the work piece, the second direction different than the first direction; and
maintaining an angle between a longitudinal axis of the probe and a direction of travel of the probe relative to the work piece, as the direction of travel of the probe changes between the first and the second directions wherein the angle is not equal to zero and maintaining the angle between the longitudinal axis of the probe and the direction of travel of the probe relative to the work piece, as the direction of travel of the probe changes between the first and the second directions, comprises:
incrementing a first stepper motor coupled to a stir welding head carrying the probe by a first jack screw according to a degree of travel in the first direction; and
incrementing a second stepper motor coupled to a turntable carrying the stir welding head by a second jack screw according to a degree of travel in the second direction.

* * * * *